Aug. 4, 1964 MIDORI IMATAKE 3,143,266
SELF-TIGHTENING ARTICLE CARRIER
Filed Oct. 4, 1961 8 Sheets-Sheet 4

United States Patent Office 3,143,266
Patented Aug. 4, 1964

3,143,266
SELF-TIGHTENING ARTICLE CARRIER
Midori Imatake, 185 Hall St., Apt. 1610,
Brooklyn 5, N.Y.
Filed Oct. 4, 1961, Ser. No. 142,897
4 Claims. (Cl. 224—52)

This invention relates generally to article carriers and more particularly to a self-tightening carrier for transporting elongated articles.

Article carriers for transporting alike elongated articles, for example bottles or cans of beverages, are known. The known carriers are usually constructed in the manner of a collapsible box or container having dividers therein for holding the articles in spaced condition arranged in the container and are also provided with a handle or hand holes by which the carrier can be picked up, moved or transported in a filled or unfilled condition. Usually the known carriers are made of rigid pasteboard and must be set up or assembled in preparation for receiving articles and must be disassembled or knocked down if they are to be readily transported in an unfilled or empty condition. Provision for collapsing or knocking-down renders the construction, and consequently the manufacturing, of known containers complex and expensive.

It is a principal object of the present invention to provide a simple, inexpensive, easily constructed carrier which is capable of snugly holding elongated articles when filled to capacity and capable of holding the articles tightly even in a partially filled condition.

Another object of the present invention is to provide a carrier that need not be set up or collapsed and is always in condition to be used.

Still another object of the present invention is to provide an article carrier which can be used for carrying elongated articles, displaying the articles or selling them as a packaged unit.

A principal feature of the self-tightening carrier, according to the invention, is the provision of cooperative support members comprising handles, to which are attached flexible, parallel bands of coextensive length for self-tightening the carrier around articles when partially filled. One of the handles is provided with two openings through which the second handle is insertable at will or threaded therethrough, when the container is partially filled, with the bands attached to the handle threaded through the other handle disposed transversely of the openings to allow the handle through which the threading has taken place to slide along the bands and cause the bands to tighten around the articles in response to the weight of the articles interlaced in the bands when the carrier is lifted by the handle through which the threading has taken place.

Another feature of the present invention is the fact that it can be used to position the articles in stacked relationship or can be hung or suspended by one of the handles, therefore, permitting the articles packaged in the carrier to be displayed in a vertical or suspended position.

Still another feature of the carrier, according to the present invention, is the provision of a construction of an article carrier which can be constructed, of suitable materials, with the flexible bands of predetermined length to carry a given number of alike articles in a filled condition. The construction of the bands permits the carrier to handle elongated articles having an irregular cross-section.

Other features and advantages of the carrier in accordance with the present invention will be better understood as described in the following specification and appended claims, in conjunction with the following drawings, in which:

Referring to FIGS. 1–6 a first embodiment of a carrier, according to the invention, comprises a first support member comprising a handle 1 to which are secured a plurality of flexible bands 3, 4, 5 of coextensive length, and equal width, each having an end connected or secured to the handle 1. The opposite ends of the flexible bands are connected or otherwise secured to a second support member comprising a second handle 7 for lifting or transporting the carrier cooperatively with the other handle. The handles 1, 7 are formed or made of a substantially rigid material, for example, by laminations of pasteboard forming a rigid or stiff pasteboard material as in the example illustrated in FIGS. 1–3. The handle 1 is formed from a plurality of layers of pasteboard material laminated in the manner illustrated in FIG. 3. The band ends are sandwiched between the layers or laminations of pasteboard material in a leg 1a of the handle 1 and bonded thereto. The handle 1 is provided with an opening or hand hole 1b so that the handle functions as a hand grip in a manner hereinafter described.

Figure 1:
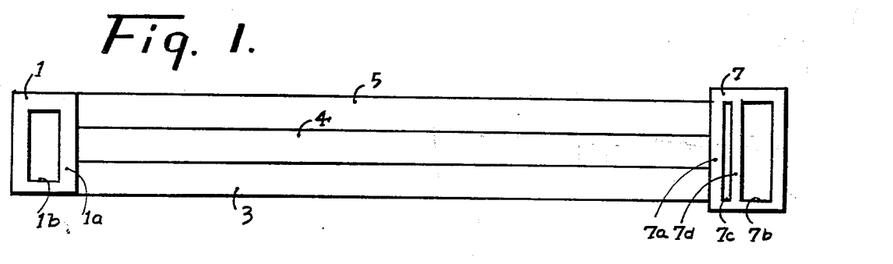
FIG. 1 is a plan view of a carrier, in an extended condition, according to the present invention.
Figure 2:
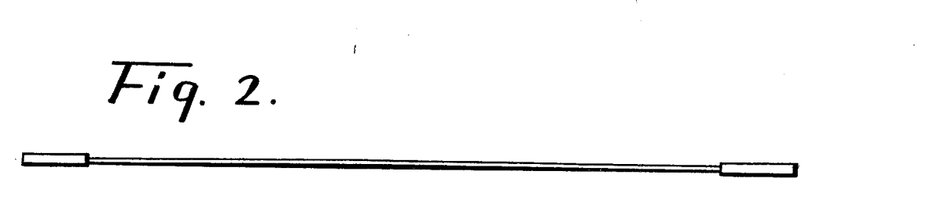
FIG. 2 is a side view of the carrier illustrated in FIG. 1.
Figure 3:
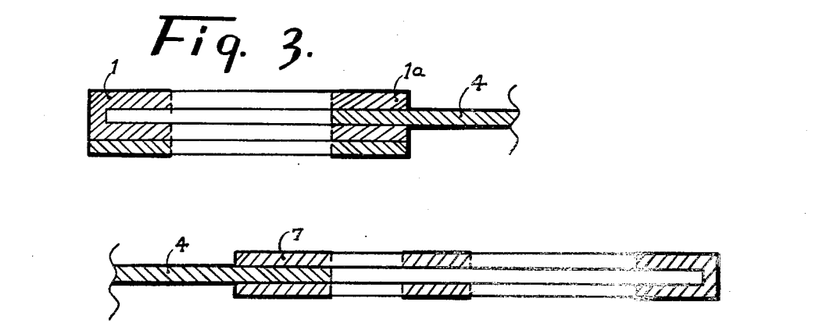
FIG. 3 is a fragmentary, longitudinal sectional view of the carrier in FIG. 1, illustrating the construction thereof.
Figure 4:
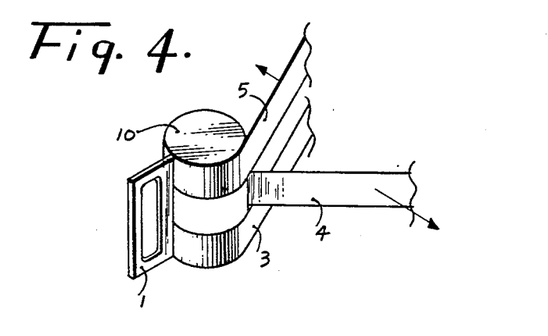
FIGS. 4 and 5 are fragmentary perspective views illustrative of the manner in which the carrier is loaded with articles to be packaged or transported therein.
Figure 5:
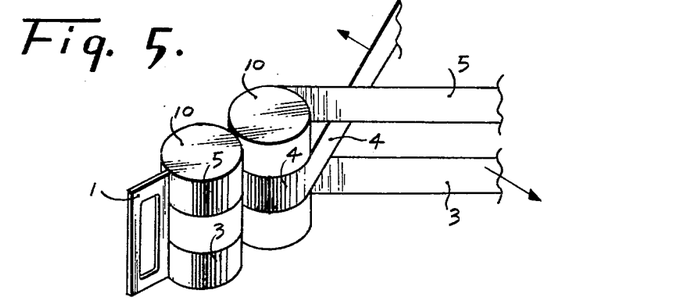
Figure 6:
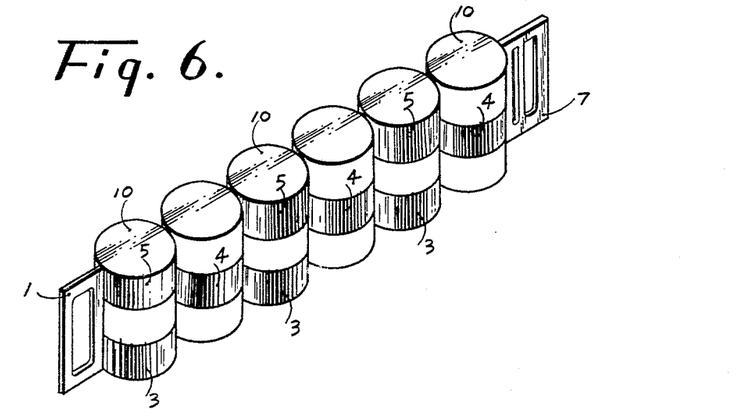
FIG. 6 is a perspective view illustrating the carrier of FIG. 1 in a completely filled condition.

The handle 7 is formed from a plurality of layers or laminations of pasteboard material and comprises a leg 7a between the layers of which are secured the opposite ends of the bands, for example by a suitable bonding agent. The handle 7 comprises an opening forming a hand hole 7b and a second narrow opening 7c spaced from the hand hole 7b by a rigid cross piece or member 7d.

Although the carrier illustrated in FIGS. 1–3 is described as being made of pasteboard layers or laminations forming rigid handles and flexible pasteboard bands, it will be understood that the carrier may be constructed, for example, with rigid plastic handles and flexible plastic bands, or with flexible cloth bands, aluminum or a cable material or any suitable material which can be flexible material from which bands can be formed and the material laminated to form rigid handles. Moreover, although the carrier has been illustrated and described as having the bands bonded or otherwise secured or connected to the handles the bands can be formed integral or have their opposite ends secured in a suitable manner to the handles, for example by rivets and the like, not shown.

The bands in carriers, according to the invention, for example bands 3, 4 and 5, are disposed adjacent each other or spaced in other embodiments as hereinafter described. In the example illustrated the bands are of equal width and in each embodiment hereafter described are of equal length and of sufficient length and strength to hold a preselected number of elongated articles of a given size and weight.

In order to load the carrier described with alike elongated articles, for example a plurality of cans 10, the articles or cans are inserted between the flexible bands so that the bands are interlaced around the articles with the next successive bands on opposite sides of the cans and every other band on the same side with the cans disposed in substantial parallel positions. A plurality of cans 10 are loaded, FIGS. 4–6, into the carrier with the individual cans disposed transversely of the bands 3–5, with the alternate band 5 disposed around one side of the individual cans and the middle band 4 around the opposite side of the individual cans with the bands being interlaced between the cans so that the same band or bands are on the same side of every other can. The successive cans are thus inserted into the carrier with the bands which pass over one side of a can disposed on an opposite side of the next successive can in the manner illustrated in FIG. 5, so that the bands are interlaced on opposite sides of the cans until the carrier is completely loaded in the manner illustrated in FIG. 6.

It will be remembered that the length of the bands determines the number of articles that can be held in the carrier. Carriers, according to the invention, may be constructed with the bands of predetermined length for carrying any given number of elongated articles of a given diameter or transverse dimensions. For example, the carrier illustrated in FIG. 6 can carry half a dozen cans 10.

Figure 7:
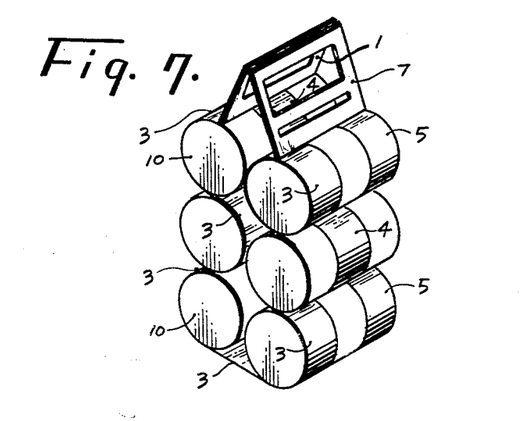
FIG. 7 is a perspective view of the carrier illustrated in FIG. 6, in a condition for transporting the carrier by using both handles so that the carrier is in a bent condition.
Figures 8, 9:
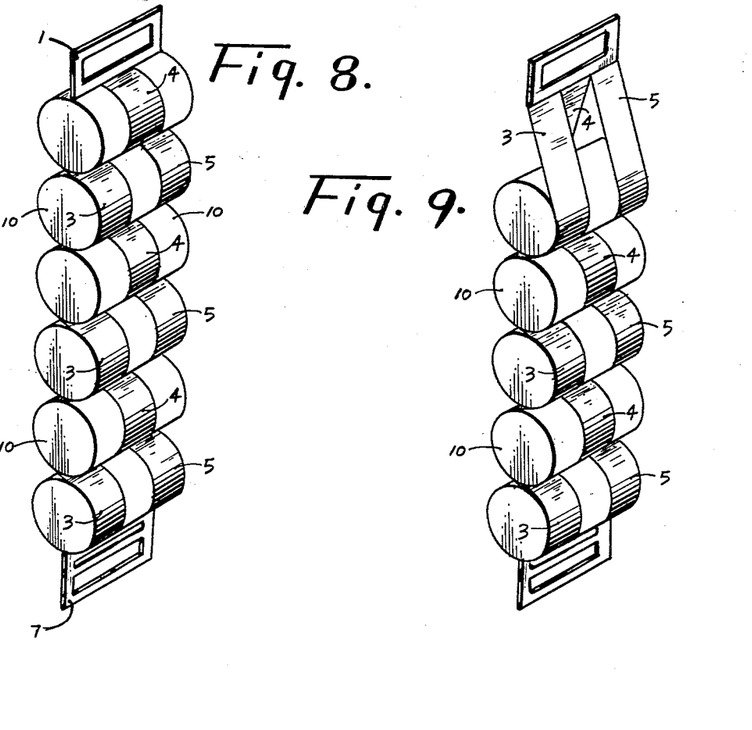
FIG. 8 is a vertical view of the carrier illustrated in FIG. 6, illustrative of the manner in which the carrier can transport a plurality of alike elongated articles in a stacked relationship with the articles substantially horizontal.
FIG. 9 is a perspective view of the carrier illustrated in FIG. 8, in a substantially filled condition illustrating the manner in which the articles are snugly held in the carrier when the carrier is substantially filled.
Figure 10:
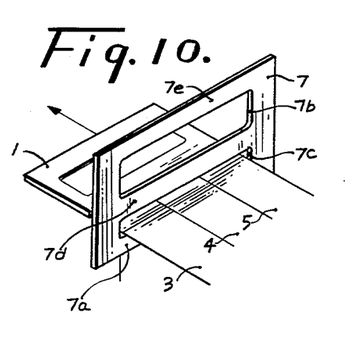
FIGS. 10 and 11 are perspective views on an enlarged scale illustrating the manner in which the one handle or support member on the carrier is threaded through a pair of spaced openings on the second handle or support member of the carrier for causing the handle to function as a selft-tightening device for causing the carrier to tighten about the articles in response to the weight of the articles when in a semi-filled condition.
Figure 11:
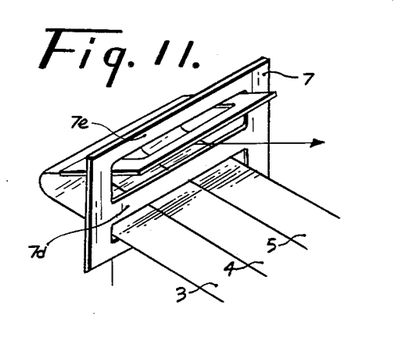

The carrier, once loaded, can be carried by bending the carrier into a U form and carrying it in a loaded condition from the two handle openings 1b, 7b disposed in the manner illustrated in FIG. 7. Alternatively, the carrier can be transported or suspended in the manner shown in FIG. 8 with either one of the handles in the uppermost position. The interlacing of the bands between the articles is such that the depending carrier can transport the articles or cans 10 even though the carrier is not quite completely filled in the manner illustrated in FIG. 9, in which only five cans are loaded into the carrier.

In order to insure that the articles in the carrier are held in the carrier in a fast or secure position when the carrier is partially filled the invention comprises a self-tightening feature, FIGS. 10–13. In order to cause the carrier to operate as a self-tightening carrier the handle 1 is inserted through the narrow elongated opening 7c of the other handle 7 with the bands disposed alongside each other transversely of the opening and the leg 7a of the handle 7 which acts as a guide for the bands. The handle 1 is drawn completely through the second handle 7 and then is reversed and inserted through the hand hole or opening 7b so that the bands pass on the same side of the legs 7a, 7e and on the opposite side of the rigid portion 7d in the manner illustrated in the drawings.

Figure 12:
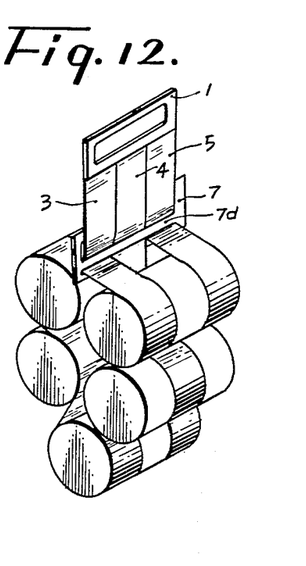
FIGS. 12 and 13 are perspective views illustrative of the manner in which the carrier, according to the invention, functions as a self-tightening carrier in response to the articles therein when in a partially filled condition.
Figure 13:
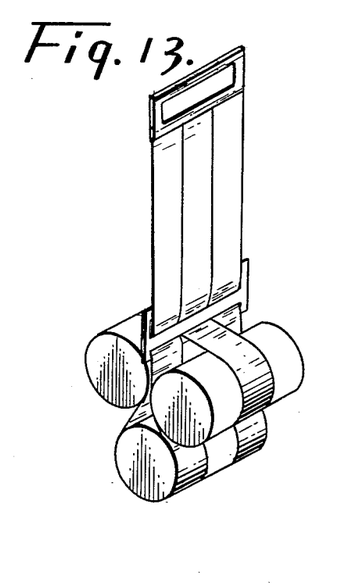

In this condition the carrier is lifted from the handle 1 after it has been inserted in the manner heretofore discussed to thread the bands through the two openings in the second handle 7. The handle 7 then functions as a member for self-tightening the carrier since it slides along the bands in response to the weight of the articles in the carrier and assumes positions thereon in dependence upon the number of articles in the carrier, as illustrated in FIGS. 12 and 13, in which five cans and three cans respectively are disposed in the carrier as illustrated.

The invention provides for construction of carriers for carrying a plurality of alike elongated articles in end-to-end relationship. The carrier embodiment illustrated in FIG. 14 comprises a handle 20 comparable to the handle 1 of the carrier already described and a handle or support member 22 comparable to the handle 7 of the carrier first described. In this construction a plurality of bands 23–27 are connected or otherwise secured to the two handles as heretofore described with respect to the first-described embodiment of the invention. In this embodiment the bands 23, 27 are of a common width and a pair of bands 24, 26 are also of a different but common width with respect to each other. A wide band 25 is provided as the central band with the other two pairs of bands on opposite sides thereof. In this construction cans 30, 31 are disposed in end-to-end relationship so that in the illustration shown fourteen cans are carried in the partially filled carrier in which the handle 22 functions as a self-tightening element as heretofore described.

In the last-described embodiments of the invention an odd number of bands are employed. It will be understood, however, that the carriers, according to the invention, for carrying articles in end-to-end relationship can also be constructed with an even number of bands in the manner illustrated in FIG. 15 in which a pair of handles 35, 36 comparable to the handles 20 and 22 respectively are provided with an even number of bands 38, 39, 40–43, in which the next successive bands pass on opposite sides of pairs of cans 45 in end-to-end relationship forming two rows side-by-side when the carrier is carried from both handles in the manner illustrated in FIG. 15. It will be understood that the embodiments of the carriers illustrated in FIGS. 14 and 15 can carry relatively long articles comparable in length to the cans shown therein in end-to-end relationship.

Figure 16:
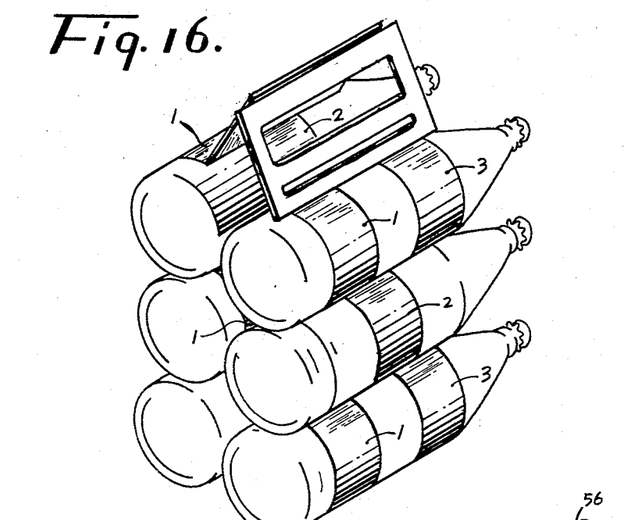
FIG. 16 is a perspective view of an embodiment, according to the present invention, illustrating the manner in which elongated articles, in the form of bottles, can be transported in the carrier.

While the first-described embodiment of the invention is illustrated as usable for transporting cans, it will be understood that the carrier can be used for transporting articles of a different configuration than cans, for example, bottles as illustrated on an enlarged scale in FIG. 16.

Figure 17:
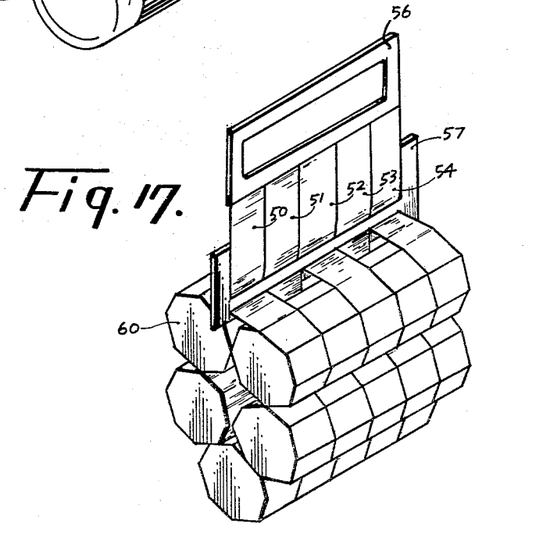
FIG. 17 is a perspective view illustrative of a carrier, according to the invention, illustrating the manner in which elongated articles of an irregular cross-sectional shape are transported in a carrier, according to the invention.

A modified embodiment of a carrier, according to the invention, in which an odd number of bands 50–54 of equal length and width are connected to a pair of handles 56, 57 constructed in a manner similar to the heretofore described handles, can be employed, for example, for carrying packages or articles 60 of irregular, cross-sectional shape as illustrated in FIG. 17.

It will be understood that in all of the heretofore described embodiments the width of the handles is sufficient to accommodate the number of bands employed and the number of bands employed is sufficient to provide substantial support along the lengths of the articles being carried which have a common transverse dimension. For example, in FIG. 16, the three bands are of a sufficient width to provide support for the bottles along substantially the body portion thereof. In FIG. 17, the bands are of a sufficient number to provide support along the full body length of the articles 60.

The carrier, according to the invention, can be constructed to lift articles of relatively great weight as a compact group in the manner of a sling. A carrier of this type is illustrated in FIG. 18 in which a carrier for transporting or lifting a plurality of cylinders 71 is constructed with a plurality of alike cables or bands 72–82 secured to a pair of support members or handles 86, 87 constructed in the shape of the handles heretofore described.

Figure 18:
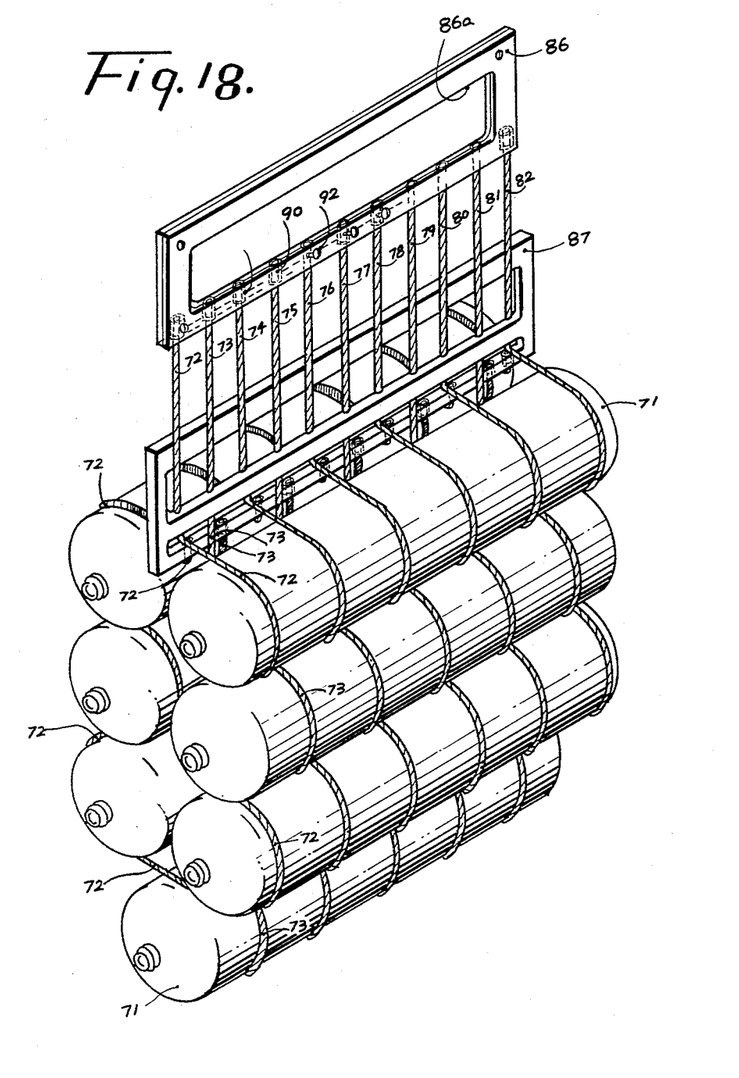
FIG. 18 is a perspective view of an embodiment of a carrier illustrative of the use of cables for the bands of the carrier, according to the invention, for transporting relatively large elongated articles in the manner of a sling.

In the illustration shown in FIG. 18, the handle 87 is constructed to function as the member that causes the self-tightening operation heretofore described with respect to the other embodiments. The handle 86 is provided with an opening 86a which in smaller versions of this embodiment of the invention can be used for lifting cylinders of a short length and not a very large diameter. On the other hand, if the cylinders 71 are relatively large cylinders the handles are constructed to support the very heavy weight and the carrier can be lifted, for example by crane hooks connected to a bridle, not shown inserted in the opening 86a, by which the entire loaded carrier can be lifted in the manner of a sling.

The bands 72, 82 are constructed as cables which in the example illustrated are rope, however, it will be understood that other suitable materials capable of sustaining the weight of the articles to be lifted can be used. The cables illustrated are secured to the handles, which are, for example metallic, by passing up through a leg of the individual handles as shown and end fittings or clamps 90 holding the ends of the ropes 72–82 are received in recesses and secured to the handles by set screws 92.

The carriers, according to the invention, can have bands made of plastic or resilient material with longitudinal grooves therein, not shown, for handling articles having a slippery surface. Moreover, the bands can be covered with a material of a high coefficient of friction so that the self-tightening handle must be adjusted in position and the binding or friction between the self-tightening and the handle tends to hold the articles in stacked relationship even though they are cylindrical, for example when a stack of bottles are being carried in a partially filled carrier and the carrier is set down with the bottles stacked on their side instead of on end they will remain stacked and the carrier will not tend to open up.

Figure 14:
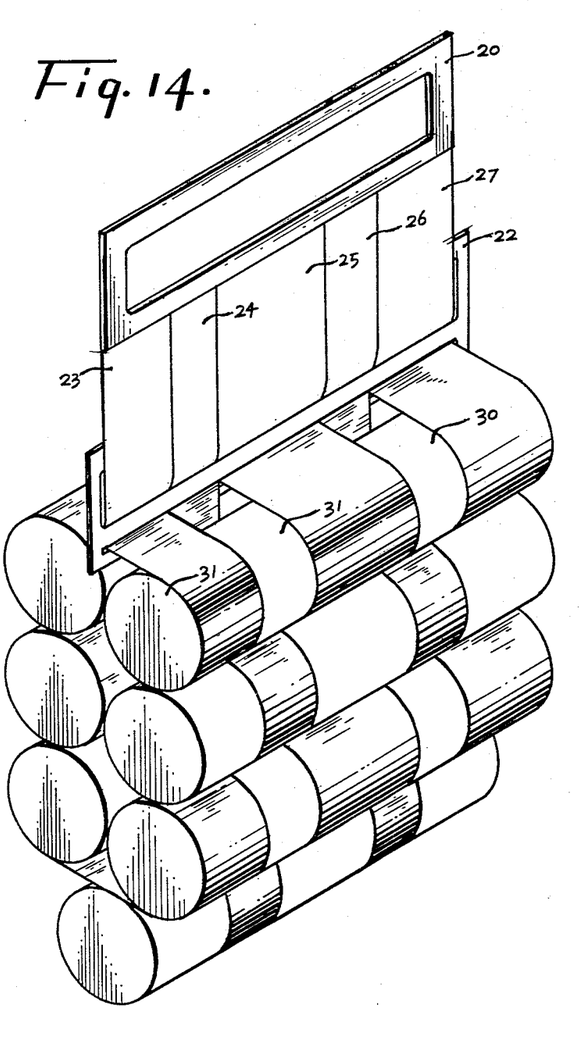
FIG. 14 is a perspective view of another embodiment of the carrier, according to the invention, for carrying alike articles in an end-to-end relationship.
Figure 15:
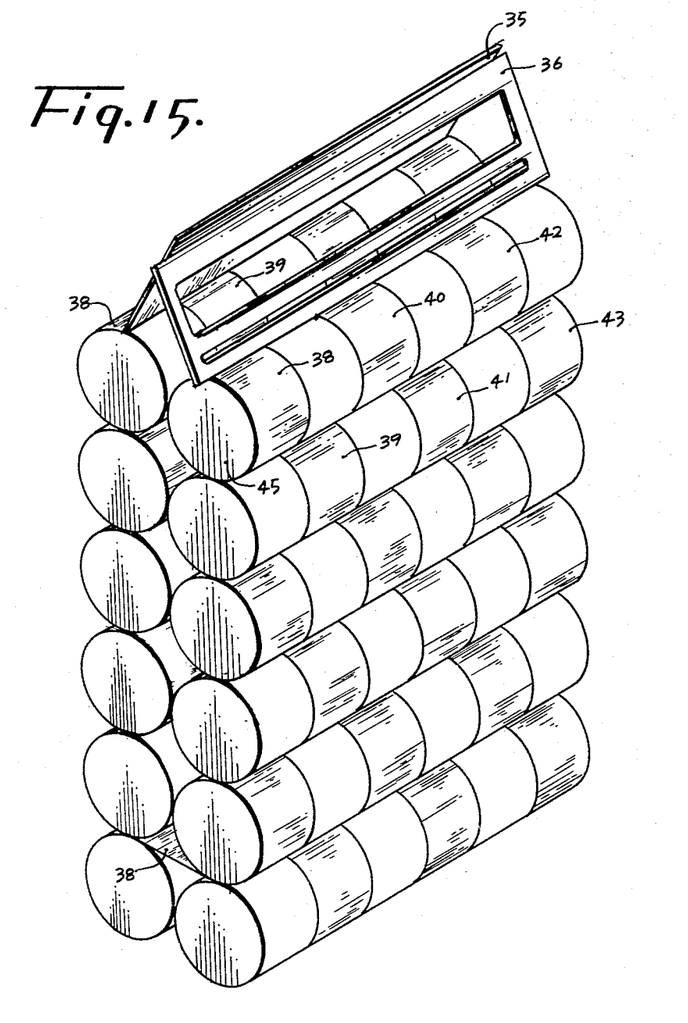
FIG. 15 is a perspective view of another embodiment of a carrier, according to the invention, for carrying articles in end-to-end relationship.

Moreover, the carrier pack, according to the invention, can be provided with a pressure-sensitive device to lock the self-tightening handle in position relative to the bands. In order to accomplish this a pressure-sensitive tape can be mounted on the handle, for example on the paper side of the portion 7d so that once the handle has been adjusted into position as illustrated in FIGS. 13 and 14 the self-tightening handle is pressed into engagement with the bands and the pressure-sensitive tape being mounted to bond onto the bands effects a bond thereon whereby any travel of the self-tightening handle on the bands is prevented and the pack maintains its adjusted position illustrated, for example in FIGS. 13 and 14.

It will be understood that in each embodiment of the invention the handle acting as the self-tightening element is wider than the other handle and they both coact for carrying out the self-tightening feature of the invention. Where it is desired that the self-tightening element slide easily in response to the weight of the articles, materials or coatings on the bands may be provided so that the self-tightening handle moves easily relative to the bands. Although the carriers, according to the invention, are illustrated as intended for carrying alike elongated articles the articles may be substantially alike as to transverse dimensions and need not be exactly alike.

While preferred embodiments of the invention have been shown and described, it will be understood that many modifications and changes can be made within the true spirit and scope of the invention.

What I claim and desire to secure by Letters Patent is:

1. A self-tightening carrier for transporting a plurality of elongated articles comprising, in combination, a first support member for lifting the carrier comprising a first handle, a second support member usable selectively as a second handle for lifting the carrier and alternatively usable in conjunction with said first handle for self-tightening said carrier, a plurality of flexible bands of coextensive length each having opposite ends each secured to a respective support member, said bands having their opposite ends secured to said support members in an arrangement in which said ends are disposed in a spaced condition relative to each other and in the same sequence relative to said two support members said bands being disposed extending parallel to each other when said carrier is empty and in an extended condition, said bands having sufficient length and flexibility to each interlace between said elongated articles receivable extending transversely of said bands with alternate bands interlaced on the same sides of said articles so that said articles are interwoven therein, each of said support members having an opening therein for lifting said carrier, said second support member having means defining an elongated separate opening spaced from the other opening thereon, said first support member being dimensioned for insertion sequentially through said separate opening and said other opening of said second support member in position with said bands connected thereto disposed side-by-side transversely of said openings in said second support member and interlaced therein in the second support member, thereby to allow said second support member to move along said bands longitudinally thereof and cause said bands to tighten around said articles in response to the weight of articles interlaced in said bands when said carrier is lifted by said first support member in at least a partially loaded condition.

2. A self-tightening carrier for transporting a plurality of elongated articles comprising, in combination, a first support member for lifting the carrier comprising a first handle, a second support member usable selectively as a second handle for lifting the carrier and alternatively usable in conjunction with said first handle for self-tightening said carrier, a plurality of flexible bands of coextensive length each having opposite ends each secured to a respective support member, said bands having their opposite ends secured to said support members in an arrangement in which said ends are disposed in a spaced condition relative to each other and in the same sequence relative to said two support members, said bands being disposed extending parallel to each other when said carrier is empty and in an extended condition, said bands having sufficient length and flexibility to each interlace between said elongated articles receivable extending transversely of said bands with alternate bands interlaced on the same sides of said articles so that said articles are interwoven therein, each of said support members having an opening therein for lifting said carrier, said second support member having means defining an elongated separate opening spaced from the other opening thereon, said first support member being dimensioned for insertion sequentially through said separate opening and said other opening of said second support member in position with said bands connected thereto disposed side-by-side transversely of said openings in said second support member and interlaced therein in the second support member, thereby to allow said second support member to move along said bands longitudinally thereof and cause said bands to tighten around said articles in response to the weight of articles interlaced in said bands when said carrier is lifted by said first support member in at least a partially loaded condition, and said bands having means forming an outer surface in contact with said interwoven articles to hold said articles from axial movement relative to said bands.

3. A self-tightening carrier for transporting a plurality of elongated articles comprising, in combination, a first support member for lifting the carrier comprising a first handle, a second support member usable selectively as a second handle for lifting the carrier and alternatively usable in conjunction with said first handle for self-tightening said carrier, a plurality of flexible flat bands of coextensive length each having opposite ends each secured to a respective support member, said bands having their opposite ends secured to said support members in an arrangement in which said ends are disposed in a spaced condition relative to each other, and in the same sequence relative to said two support members, said bands being disposed extending parallel to each other when said carrier is empty and in an extended condition, said bands having sufficient length and comprising a material imparting sufficient flexibility to each band to interlace between said elongated articles receivable extending transversely of said bands with alternate bands interlaced on the same sides of said articles so that said articles are interwoven therein, each of said support members having an opening therein for lifting said carrier, said second support member having means defining an elongated separate opening spaced from the other opening thereon, said first support member being dimensioned for insertion sequentially through said separate opening and said other opening of said second support member in position with said bands connected thereto disposed side-by-side transversely of said openings in said second support member and interlaced therein in the second support member, thereby to allow said second support member to move along said bands longitudinally thereof and cause said bands to tighten around said articles in response to the weight of articles interlaced in said bands when said carrier is lifted by said first support member in at least a partially loaded condition.

4. A self-tightening carrier for transporting a plurality of elongated articles comprising, in combination, a first support member for lifting the carrier comprising a first handle, a second support member usable selectively as a second handle for lifting the carrier and alternatively usable in conjunction with said first handle for self-tightening said carrier, a plurality of flexible cables of coextensive length each having opposite ends each secured to a respective support member, said cables having their opposite ends secured to said support members in an arrangement in which said ends are disposed in a spaced condition relative to each other and in the same sequence relative to said two support members, said cables being disposed extending parallel to each other when said carrier is empty and in an extended condition, said cables having sufficient length and comprising a material imparting sufficient flexibility to each band to interlace between said elongated articles receivable extending transversely of said cables with alternate cables interlaced on the same sides of said articles so that said articles are interwoven therein, each of said support members having an opening therein for lifting said carrier, said second support member having means defining an elongated separate opening spaced from the other opening thereon, said first support member being dimensioned for insertion sequentially through said separate opening and said other opening of said second support member in position with said bands connected thereto disposed side-by-side transversely of said openings in said second support member and interlaced therein in the second support member, thereby to allow said second support member to move along said cables longitudinally thereof and cause said cables to tighten around said articles in response to the weight of articles interlaced in said cables when said carrier is lifted by said first support member in at least a partially loaded condition.

References Cited in the file of this patent

UNITED STATES PATENTS

| | | |
|---|---|---|
| 1,686,288 | Meals | Oct. 2, 1928 |
| 1,723,841 | Butler | Aug. 6, 1929 |
| 2,042,806 | Shulte | June 2, 1936 |